(12) United States Patent
Kojima (10) Patent No.: US 6,614,600 B2
(45) Date of Patent: Sep. 2, 2003

(54) OBJECTIVE LENS AND OPTICAL PICKUP APPARATUS

(75) Inventor: Toshiyuki Kojima, Tokyo (JP)

(73) Assignee: Konica Corporation, Tokyo (JP)

( * ) Notice: Subject to any disclaimer, the term of this patent is extended or adjusted under 35 U.S.C. 154(b) by 0 days.

(21) Appl. No.: 10/135,310

(22) Filed: Apr. 29, 2002

(65) Prior Publication Data

US 2003/0002175 A1 Jan. 2, 2003

(30) Foreign Application Priority Data

May 16, 2001 (JP) .......... 2001-146292

(51) Int. Cl.[7] .......... G02B 13/18; G02B 3/08; G11B 7/135
(52) U.S. Cl. .......... 359/719; 359/743; 369/112.12
(58) Field of Search .......... 369/112.13, 112.11, 369/112.12; 359/719, 742, 743

(56) References Cited

U.S. PATENT DOCUMENTS 6,285,646 B1 * 9/2001 Yoo et al. .......... 369/112.26

2002/0089764 A1 * 7/2002 Ikenaka et al. .......... 359/719

* cited by examiner

*Primary Examiner*—Scott J. Sugarman
(74) *Attorney, Agent, or Firm*—Squire, Sanders & Dempsey, L.L.P.

(57) ABSTRACT

An objective lens comprises an inner optically functional region an inner optically functional region allowing a light flux to pass through for conducting recording and/or reproducing information for a first and second optical information recording mediums, an outer optically functional region allowing a light flux to pass through for conducting recording and/or reproducing information for the first optical information recording medium; and a diffractive structure provided on the outer optically functional region. The objective lens satisfies the following formulas:

$$\lambda > 700 \text{ nm}, NA1 > 0.65 \text{ and } t1 < t2$$

wherein $\lambda$ is a wavelength, NA1 is a numerical aperture, t1 and t2 are a thickness of a transparent base board of the first information recording medium and the second information recording medium.

12 Claims, 6 Drawing Sheets

DISCONTINUOUS

DISCONTINUOUS
FOR FIRST-ORDER
DIFFERENTIAL

DISCONTINUOS
FOR A CERTAIN
WAVELENGTH

OBJECTIVE LENS AND OPTICAL PICKUP APPARATUS

BACKGROUND OF THE INVENTION

The present invention relates to an objective lens used for an optical pickup device and to the optical pickup device, and in particular, to an objective lens for an optical pickup device and to the optical pickup device.

There has been developed an optical pickup device which can record and reproduce information for optical information recording media of different types such as, for example, DVD and CD, and is used for various uses. The optical pickup device of this kind is required to have various kinds of demands including compactness in structure and low cost.

As a light source for an optical pickup device, a semiconductor laser is generally used, and two light sources including a light source for DVD and that for CD have so far been used, because an optimum wavelength for recording and/or reproduction of information for DVD is 635 nm or about 650 nm and an optimum wavelength for recording and/or reproduction of information for CD is about 780 nm.

However, an increase in cost of an optical pickup device is caused by providing two expensive semiconductor lasers. Therefore, it is requested to throw two semiconductor lasers into one. To satisfy this request, it is conceivable that a light source for DVD is used to reproduce information of CD. In a write-once compact disk (CD-R) developed recently, however, there is a problem that recording or reproduction of information cannot be performed because reflectance of light for DVD whose wavelength is about 635 nm is extremely low and reflected light with sufficient amount of light cannot be obtained accordingly.

With the background mentioned above, there are disclosed in TOKKAIHEI NO. 9-306014 by the applicant of this invention an optical pickup device and an objective lens to be used for the optical pickup device which can conduct recording or reproduction of information for DVD and CD-R by using a wavelength which lies between a wavelength of light for DVD and a wavelength of light for CD.

However, when light with the intermediate wavelength disclosed in TOKKAIHEI NO. 9-306014 is used, there still is a problem that it is difficult to conduct recording or reproduction of information for the compact disk (CD-RW) which is more strict than CD-R from a viewpoint of reflectance and can erase information. In addition, there is a fear that a unit cost of a semiconductor laser with the intermediate wavelength may turn out to be high because of less demand for that semiconductor laser.

In TOKKAIHEI NO. 11-339306, on the other hand, there is disclosed an optical pickup device which can conduct reproduction for DVD by using light with wavelength of 780 nm. However, the conventional technology of this kind is one to eliminate an influence of side lobe that is caused when conducting reproduction of DVD using light with wavelength of 780 nm, and it requires an additional circuit for that purpose, resulting in an increase in cost of the optical pickup device.

For these problems, there is an attempt to create an objective lens that shows excellent aberration even when a light flux with high NA and longer wavelength and conducts information recording and reproduction for DVD and CD, by forming plural optical functional regions on the optical surface of the objective lens in the direction perpendicular to the optical axis, and by using an inner optical functional region for both DVD and CD while using an outer optical functional region for DVD only.

For the attempt stated above, it is preferable that the objective lens is made of plastic materials, for carrying out mass production at lower cost. However, since a change in refractive index caused by ambient temperature is great in the case of plastic materials, it is difficult, even when plural optical functional regions are provided, to correct aberration caused by changes in refractive index under the environmental condition of intense changes in temperatures.

In particular, when NA grows to be higher, the tendency for spherical aberration changes caused by temperature changes to increase becomes more remarkable. In this case, amount of change $\delta SA_3$ of third-order component of spherical aberration caused by temperature change is expressed by the following expression when NA represents an image side numerical aperture of the objective lens, f represents a focal length, m represents an image forming magnification, and $\lambda$ represents a wavelength of the laser light source.

$$(\delta SA_3/\delta T) \cdot f \cdot (1-m)^4 \cdot NA^4/\lambda \tag{1}$$

It is apparent from the expression (1) that aberration correction is more difficult when numerical aperture NA of an objective lens grows greater, because the spherical aberration shows a tendency to deteriorate in proportion to the fourth power of the numerical aperture NA.

SUMMARY OF THE INVENTION

The invention has been achieved in view of the problems in the conventional technology, and its object is to provide an optical pickup device and an objective lens to be used in the optical pickup device which can conduct recording and/or reproduction of information for optical information recording media each being different from others by using a single light source with a relatively long wavelength, without using an additional electric circuit, and can control a decline of efficiency caused by ambient changes.

The objective lens to be used in an optical pickup device described in Structure 1 is represented by an objective lens to be used in an optical pickup device having therein a light source and a light converging optical system including an objective lens to conduct recording and/or reproduction of information by making a light flux emitted from the light source to form an image on an image recording surface through transparent base boards of the first and second optical information recording media, wherein when $\lambda$ represents a wavelength of the light source, NA1 represents a numerical aperture on the information recording surface side of the objective lens in the case of recording or reproduction of information for the first optical information recording medium, t1 represents a thickness of the transparent base board of the first optical information recording medium and t2 represents a thickness of the transparent base board of the second optical information recording medium, $$\lambda > 700 \text{ nm} \tag{2}$$

$$NA1 > 0.65 \tag{3}$$

$$t1 < t2 \tag{4}$$

and a plurality of optical functional regions are formed on an optical surface of the objective lens so that a distance of each optical functional region from the optical axis in the direction perpendicular to the optical axis may be different, and an inner optical functional region closer to the optical axis among the aforesaid optical functional regions is arranged to allow a light flux emitted from the light source to pass through for conducting recording or reproduction of information for the first and second optical information recording media, and an outer optical functional region which is farther than the inner optical functional region from the optical axis among the aforesaid optical functional regions is arranged to allow a light flux emitted from the light source to pass through for conducting recording or reproduction of information for the first optical information recording medium, and a diffractive structure is formed on the outer optical functional region.

The invention makes it possible to conduct recording or reproduction of information effectively even when CD-R or CD-RW is used for the second optical information recording medium, for example, because wavelength $\lambda$ of the light source exceeds 700 nm. On the other hand, when DVD is used as the first optical information recording medium, for example, there is a fear that an amount of light necessary for recording or reproduction of information may be insufficient for light whose wavelength $\lambda$ exceeds 700 nm. In the invention, therefore, the numerical aperture NA1 is made to be greater than 0.65 so that sufficient amount of light may be obtained. Further, for deterioration of spherical aberration caused by a thickness of a transparent base board of the first optical information recording medium and a thickness of a transparent base board of the second optical information recording medium which are different each other, an optimum balance is achieved by the method described below.

Figure 1:
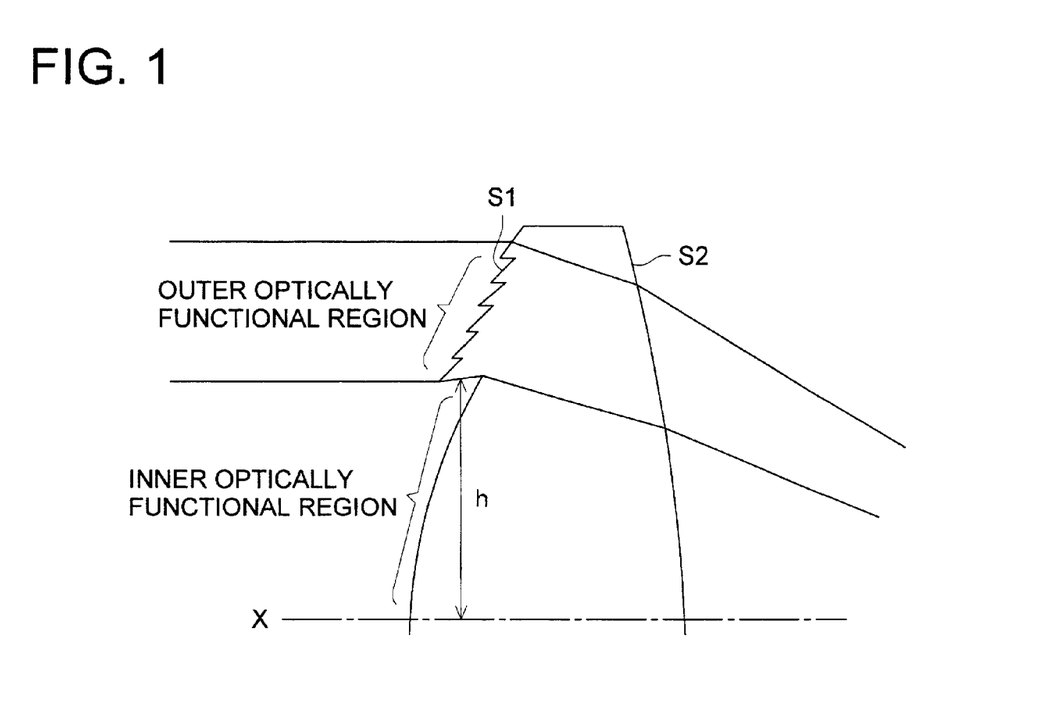
FIG. 1 is a partial section showing illustratively the objective lens related to an example of the invention.

FIG. 1 is a partial section showing illustratively an example of the objective lens of the invention related to Structure 1. On optical surface S1 of the objective lens closer to the light source in FIG. 1, an inner optical functional region is formed on the portion within h from the optical axis, and on the portion that is outside the inner optical functional region, there is formed an outer optical functional region. Each of the inner optical functional region and the outer optical functional region is composed of a refractive interface in this case, and a step is formed between them. In the present example, the inner optical functional region is a common area to be used for both the first and second optical information recording media, for example, for both DVD and CD, and by setting the refracting interface of such area based on the medium value of the transparent base boards of both recording media, it is possible to control, in a well-balanced way, the spherical aberration in the light flux that has passed through the area, no matter which medium is used. On the other hand, the outer optical functional region is an exclusive area only for the first optical information medium, for example, for DVD, and by setting the refracting interface of such area based on transparent base board thickness t1 of the first optical information recording medium, it is possible to control properly the spherical aberration in the light flux for conducting recording or reproduction of information for the aforesaid medium. Further, since the diffractive structure is formed on the outer optical functional region, deterioration of aberration caused by changes in the refractive index in accordance with temperature changes in the case of conducting recording or reproduction of information for the first optical information recording medium can be controlled.

In the objective lens of the optical pickup device described in Structure 2, the aforesaid optical functional regions in quantity of three or more are provided, and an intermediate optical functional region is formed between the inner optical functional region and the outer optical functional region.

Figure 2:
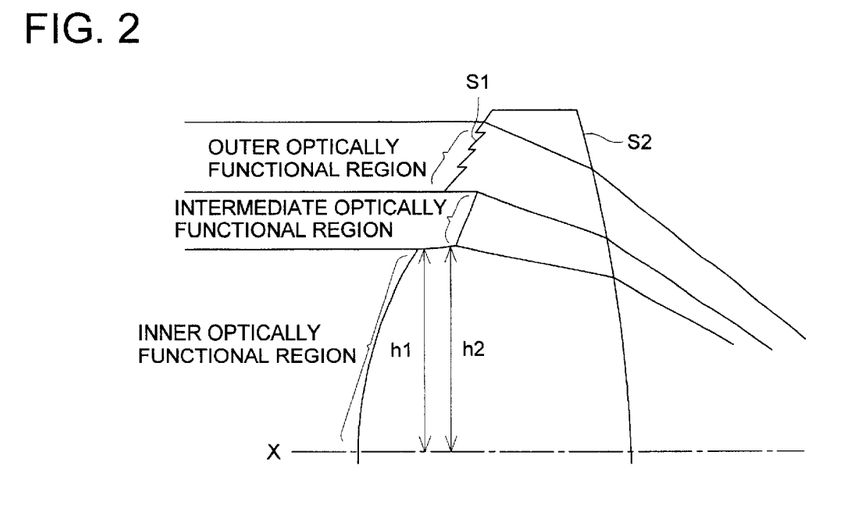
FIG. 2 is a partial section showing illustratively the objective lens related to another example of the invention.

FIG. 2 is a partial section showing illustratively an example of the objective lens of the invention related to Structure 2. In FIG. 2, on optical surface S1 of the objective lens closer to a light source, an inner optical functional region is formed on a portion from the optical axis up to height h1, an outer optical functional region is formed on a portion that is outside of distance h2 from the optical axis, and an intermediate optical functional region is formed between the aforesaid two areas. Each optical functional region is composed of a refracting interface respectively in this case, and a step is formed between them.

Even in the present example, the inner optical functional region is a common area to be used for both the first and second optical information recording media, for example, for both DVD and CD, and by setting the refracting interface of such area based on the medium value of the transparent base boards of both recording media, it is possible to control, in a well-balanced way, the spherical aberration in the light flux that has passed through the area, no matter which medium is used. On the other hand, the outer optical functional region is an exclusive area only for the first optical information medium, for example, for DVD, and by setting and by setting the refracting interface of such area based on transparent base board thickness t of the first optical information recording medium, it is possible to control properly the spherical aberration in the light flux for conducting recording or reproduction of information for the aforesaid medium. Further, the intermediate optical functional region is an exclusive area only for the second optical information medium, for example, for CD, and by setting the refracting interface of such area based on transparent base board thickness t2 of the first optical information recording medium, it is possible to control properly the spherical aberration in the light flux for conducting recording or reproduction of information for the aforesaid medium. Incidentally, it is also possible to provide a diffractive structure on at least one of the intermediate optical function area and the inner optical functional region. Further, though the intermediate optical function area is used as an exclusive area for CD, it is also possible to divide the intermediate optical function area into plural portions in the direction perpendicular to an optical axis, and thereby to use them as an exclusive area for CD or an exclusive area for DVD.

The objective lens of the optical pickup device described in Structure 3 is characterized to satisfy the following expressions.

$$NA1 < 0.95 \tag{5}$$

$$\lambda < 1000 \text{ nm} \tag{6}$$

The objective lens of the optical pickup device described in Structure 4 is characterized to satisfy the following expressions when NA2 represents a numerical aperture of the objective lens on the information recording surface side in the case of conducting recording or reproduction of information for the second optical information recording medium.

$$0.3 < NA2 < 0.55 \tag{7}$$

The objective lens of the optical pickup device described in Structure 5 can be manufactured at low cost on a mass production basis, when it is made of plastic materials.

With respect to the objective lens of the optical pickup device described in Structure 6, when the optical functional regions are formed in a way that a step is given to each boundary portion between the optical functional regions, an operation for a discontinuous amount of spherical aberration is easy, exemplifying that separation between main spot light and flare light on the image recording surface of an optical information recording medium can be made great. Incidentally, in the intermediate optical functional region, it is preferable for the purpose of aberration correction for the second optical information recording medium that a step at the boundary portion that is farther from an optical axis is made to be greater than that at the boundary portion that is closer to an optical axis.

An optical pickup device described in Structure 7 is represented by an optical pickup device having therein a light source and a light converging optical system including an objective lens for conducting recording and/or reproduction of information by making a light flux emitted from the light source to form images on the information recording surface through a transparent base board on each of the first and second optical information recording media, wherein the following expressions are satisfied when λ represents a wavelength of the light source, NA1 represents the numerical aperture of the objective lens on the information recording surface side in the case of conducting recording or reproduction of information for the first optical information recording medium, t1 represents a thickness of a transparent base board of the first optical information recording medium and t2 represents a thickness of a transparent base board of the second optical information recording medium, $$\lambda < 700 \text{ nm} \tag{2}$$

$$NA1 < 0.65 \tag{3}$$

$$t1 < t2 \tag{4}$$

a plurality of optical functional regions are formed on the optical surface of the objective lens to be different in terms of distance from an optical axis in the direction perpendicular to the optical axis, the inner optical functional region closer to the optical axis among the optical functional regions is arranged to allow a light flux emitted from the light source to pass through for conducting recording or reproduction of information for the first and second optical information recording media, the outer optical functional region that is farther from the optical axis than the inner optical functional region among the optical functional regions is arranged to allow a light flux emitted from the light source to pass through for conducting recording or reproduction of information for the first optical information recording medium, and a diffractive structure is formed on the outer optical functional region. An action and an effect of the present invention are the same as those in the invention described in Structure 1.

In the optical pickup device described in Structure 8, the aforesaid optical functional regions in quantity of three or more are provided, and an intermediate optical functional region is formed between the inner optical functional region and the outer optical functional region. An action and an effect of the present invention are the same as those in the invention described in Structure 2.

The optical pickup device described in Structure 9 is characterized to satisfy the following expressions.

$$NA1 < 0.95 \tag{5}$$

$$\lambda < 1000 \text{ nm} \tag{6}$$

The optical pickup device described in Structure 10 is characterized to satisfy the following expression when NA2 represents the numerical aperture of the objective lens on the information recording surface side in the case of conducting recording or reproduction of information for the second optical information recording medium.

$$0.3 < NA2 < 0.55 \tag{7}$$

The optical pickup device described in Structure 11 is characterized in that the objective lens is made of plastic materials. An action and an effect of the present invention are the same as those in the invention described in Structure 5.

The optical pickup device described in Structure 12 is characterized in that each optical functional region is formed to have a step at a portion that is a boundary with an adjacent optical functional region. An action and an effect of the present invention are the same as those in the invention described in Structure 6.

In the present specification, when an "optical functional region" is expressed with spherical aberration, let is be assumed that a different optical functional region is present when the expression comes under either one of the following conditions.

Figure 3:
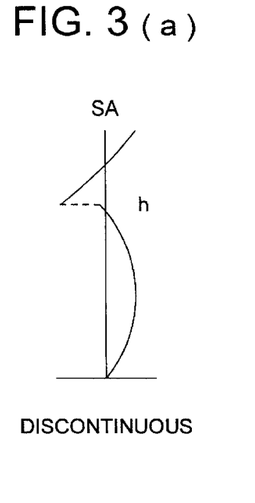
FIGS. 3(a) to 3(c) each is a diagram showing that the spherical aberration is discontinuous.

(a) When the "optical functional region" is discontinuous at the boundary represented by h (FIG. 3(a))

(b) When the "optical functional region" is continuous, but first order differential is discontinuous (FIG. 3(b))

(c) When the "optical functional region" is continuous at h in a certain wavelength (FIG. 3(c))

An area that is divided under the aforesaid condition and allows each light flux to pass through is regarded as an "optical functional region". Therefore, when one surface of a lens is looked, if there exist a refracting portion and a diffracting portion (diffractive structure), the refracting portion and the diffracting portion are assumed to be different and separate "optical functional regions" with a boundary portion serving as a border between the refracting portion and the diffracting portion (see FIGS. 1 and 2). Further, when diffractive structures designed for different objects are made to be present mixedly under the condition that diffractive structures are formed on the entire surface, they are assumed, from the condition of (c) above, to be different and separate "optical functional regions". Further, even when an aspheric surface expressed by the same aspherical coefficient is formed on the surface on one side, they are assumed to be different and separate optical surfaces even when a discontinuous portion is formed on the surface on the other side.

Incidentally, "outer optical functional region" means an outer optical functional region within an effective diameter, and even when another optical surface is provided within a range that does not affect on recording or reproduction for an optical information recording medium substantially on a partial area in that optical functional region, the invention is not affected, and even if a partial optical surface exists in an effective diameter, such partial optical surface should be ignored and should be considered to be nothing, which applies also to other optical functional regions.

The "diffractive structure" used in the present specification means a portion on the surface of an objective lens which is provided with a relief to have the function to converge or diverge a light flux through diffraction. With respect to a form of the relief, it includes a known form of ring-shaped zones which are mostly in the form of concentric circles whose center is an optical axis and are formed on the surface of an objective lens as shown in FIGS. 1 and 2, for example, each looking like a saw-tooth in a sectional view when viewed on a plane including the optical axis, and this form is especially called "diffractive ring-shaped zone".

In the present specification, it is assumed that the objective lens in a narrow sense is a lens having a light-converging function arranged to face an optical information recording medium at the position closest to the optical information recording medium under the condition that the optical information recording medium is loaded in the optical pickup device, and the objective lens in a broad sense is a lens capable of being operated, by an actuator, at least in its optical axis direction together with the aforesaid lens. In the present specification, therefore, numerical aperture NA of the objective lens on the optical information recording medium side (image side) means numerical aperture NA of the lens surface of the objective lens positioned to be closest to the optical information recording medium. Further, necessary numerical aperture NA in the present specification is the numerical aperture of the objective lens having diffraction limit performance which makes it possible to obtain a spot diameter necessary for conducting recording or reproduction of information in accordance with a wavelength of a light source to be used, for the numerical aperture specified by the standard of each optical information recording medium or for each optical information recording medium.

In the present specification, the second optical information recording medium means optical disks of various CD types such as, for example, CD-R, CD-RW, CD-Video and CD-ROM, while, the first optical information recording medium means optical disks of various DVD types such as DVD-ROM, DVD-RAM, DVD-R, DVD-Rw and DVD-Video. In addition, thickness t of a transparent base board in the present specification includes t=0.

DETAILED DESCRIPTION OF THE PREFERRED EMBODIMENT

Figure 4:
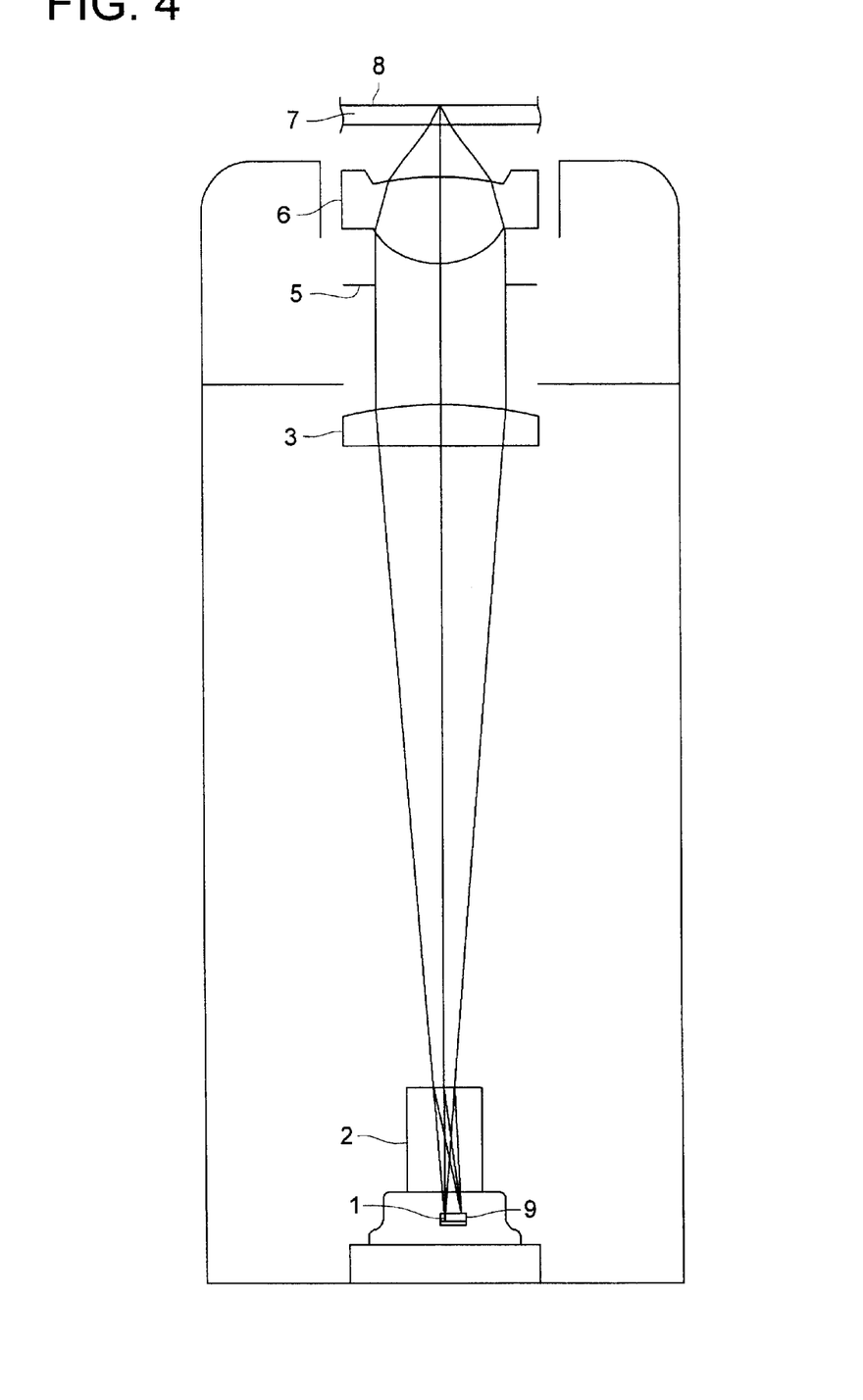
FIG. 4 is a schematic structural diagram of an optical pickup device related to the example of the invention.

The invention will further be explained in detail as follows, referring to the drawings. FIG. 4 is a schematic structural diagram of an optical pickup device related to the present example. In FIG. 4, a light flux emitted from laser light source 1 passes through hologram beam splitter 2 and enters collimator lens 3 to become a collimated light flux, and enters objective lens 6 after being regulated by diaphragm 5 to a prescribed light flux. This objective lens 6 is one which makes a light spot to form an image on information recording surface 8 through a transparent base board (t is 0.6 mm or 1.2 mm in this case) when the collimated light flux enters.

The light flux modulated by information bits and reflected on the information recording surface 8 passes through objective lens 6 and collimator lens 3, and returns to hologram beam splitter 2 to be separated from an optical path originated from the laser light source 1 therein, and enters optical detector 9. This optical detector 9 is a multi-divided PIN photodiode, and an electric current that is in proportion to intensity of the light flux that has entered is outputted from each element. This electric current is sent to a detecting circuit system which is not shown in the drawing to generate information signals, focus error signals and track error signals in the detecting circuit system. The objective lens 6 is controlled in the focusing direction and in the tracking direction by two-dimensional actuator (not shown) composed of a magnetic circuit and a coil based on the focus error signals and track error signals, thus, it is possible to make the position of a light spot to be on the information track constantly.

The example described below is one related to an objective lens which can be applied to the aforesaid example, is one wherein three optical functional regions are provided as shown in FIG. 2. Table 1 shows lens data of the objective lens of the present example. Incidentally, from on (including the lens data in the table), an exponent of 10 (for example, $2.5 \times 10^{-3}$) is expressed by using E (for example, 2.5×E-3).

TABLE 1

Example 1
fo = 3.472 NA = 0.72
Standard wavelength: 780 nm

| i | ri | d1i | d2i | Material | Refractive index |
|---|---|---|---|---|---|
| 1 | ∞ | ∞ | ∞ | | |
| 2 | 1.855 | 2.37 | 3.08 | Olefin resin | 1.53738 |
| 3-1 | −6.5514 | 1.42 | 1.03 | | |
| 3-2 | −5.388 | | | | |
| 4 | ∞ | 0.6 | 1.2 | PC | 1.57084 |

*3-1: First divided surface of the third surface
*3-2: Second divided surface (diffractive surface) of the third surface Aspheric surface data
Second surface
First divided surface and third divided surface
(0 ≤ H ≤ 1.345, H ≥ 1.580)
Aspherical coefficient

| κ | −6.31600E-01 | | |
|---|---|---|---|
| A0 | 0.00000E+00 | P0 | 0.0 |
| A1 | −1.45970E-03 | P1 | 3.0 |
| A2 | 4.35710E-03 | P2 | 4.0 |
| A3 | −1.37850E-04 | P3 | 5.0 |
| A4 | −3.83140E-04 | P4 | 6.0 |
| A5 | 5.11820E-04 | P5 | 7.0 |
| A6 | −2.03160E-04 | P6 | 8.0 |
| A7 | 6.13190E-05 | P7 | 10.0 |
| A8 | −9.83740E-06 | P8 | 12.0 |

Second divided surface (1.345 ≤ H ≤ 1.580)
Aspherical coefficient

| κ | −6.28070E-01 | | |
|---|---|---|---|
| A0 | 9.50000E-04 | P0 | 0.0 |
| A1 | −1.27560E-03 | P1 | 3.0 |
| A2 | 4.45560E-03 | P2 | 4.0 |
| A3 | −8.29990E-05 | P3 | 5.0 |
| A4 | −3.52310E-04 | P4 | 6.0 |
| A5 | 5.29020E-04 | P5 | 7.0 |
| A6 | −1.93780E-04 | P6 | 8.0 |

-continued

| | | | |
|---|---|---|---|
| A7 | 6.37100E-05 | P7 | 10.0 |
| A8 | -9.56010E-06 | P8 | 12.0 |
| Third surface | | | |
| First divided surface H ≦ 0.8325 | | | |
| Aspherical coefficient | | | |
| κ | -7.65800E+00 | | |
| A0 | 0.00000E+00 | P0 | 0.0 |
| A1 | -2.53430E-03 | P1 | 3.0 |
| A2 | 3.80120E-02 | P2 | 4.0 |
| A3 | -8.90880E-03 | P3 | 5.0 |
| A4 | -8.97750E-03 | P4 | 6.0 |
| A5 | 5.11880E-03 | P5 | 7.0 |
| A6 | -1.36540E-03 | P6 | 8.0 |
| A7 | 1.90220E-04 | P7 | 10.0 |
| A8 | -1.96100E-05 | P8 | 12.0 |
| Second divided surface H ≧ 0.8325 (diffractive surface) | | | |
| Aspherical coefficient | | | |
| κ | -4.67500E-01 | | |
| A0 | 0.00000E+00 | P0 | 0.0 |
| A1 | 2.50600E-02 | P1 | 4.0 |
| A2 | -9.10320E-03 | P2 | 6.0 |
| A3 | -1.55910E-03 | P3 | 8.0 |
| A4 | 3.65540E-03 | P4 | 10.0 |
| A5 | -1.60250E-03 | P5 | 12.0 |
| A6 | 2.99660E-04 | P6 | 14.0 |
| A7 | -2.28840E-05 | P7 | 16.0 |
| Optical path difference function | | | |
| (Manufacture wavelength 780 nm) | | | |
| B2 | -8.38840E-03 | | |
| B4 | -9.34190E-03 | | |
| B6 | 8.30660E-03 | | |
| B8 | -3.81910E-03 | | |
| B10 | 6.18870E-04 | | |

The objective lens of the present example is composed of a plastic lens whose both surfaces represent an aspheric surface, and each aspheric surface has an aspherical form expressed by Numeral 1.

$$Z = \frac{h^2/R_0}{1+\sqrt{1-(1+\kappa)(h/R_0)^2}} + \sum_{i=1}^{\infty} A_i h^{P_i} \quad \text{(Numeral 1)}$$

In the above expression, Z represents an axis in the direction of an optical axis, h represents an axis in the direction perpendicular to the optical axis, $R_0$ represents a paraxial radius of curvature, κ represents the constant of the cone, A represents aspherical coefficient, and P represents an exponent of an aspheric surface.

A diffractive structure is generally expressed by Numeral 2 with a unit of radian by the use of phase difference function Φb.

$$\Phi_b = \sum_{i=1}^{\infty} b_{2i} h^{2i} \quad \text{(Numeral 2)}$$

By making the second-order coefficient to be a nonzero value, it is possible to make the diffractive portion to have paraxial power. Further, by making coefficients of the phase difference function other than the $2^{nd}$ order coefficient, for example, $4^{th}$ order coefficient, $6^{th}$ order coefficient and so forth to be nonzero values, it is possible to control the spherical aberration. "To control" in this case means to correct the total spherical aberration by making the spherical aberration owned by a refracting portion to have spherical aberration having opposite characteristics, or to manipulate the spherical aberration of the diffractive portion and thereby to make the total spherical aberration to be the desired flare amount. Therefore, the spherical aberration in the case of temperature changes can be considered to be the total of the temperature changes of spherical aberration of the refracting portion and spherical aberration changes of the diffractive portion. In the present example, the diffractive structure is provided on the outer optical functional region.

Figure 5:
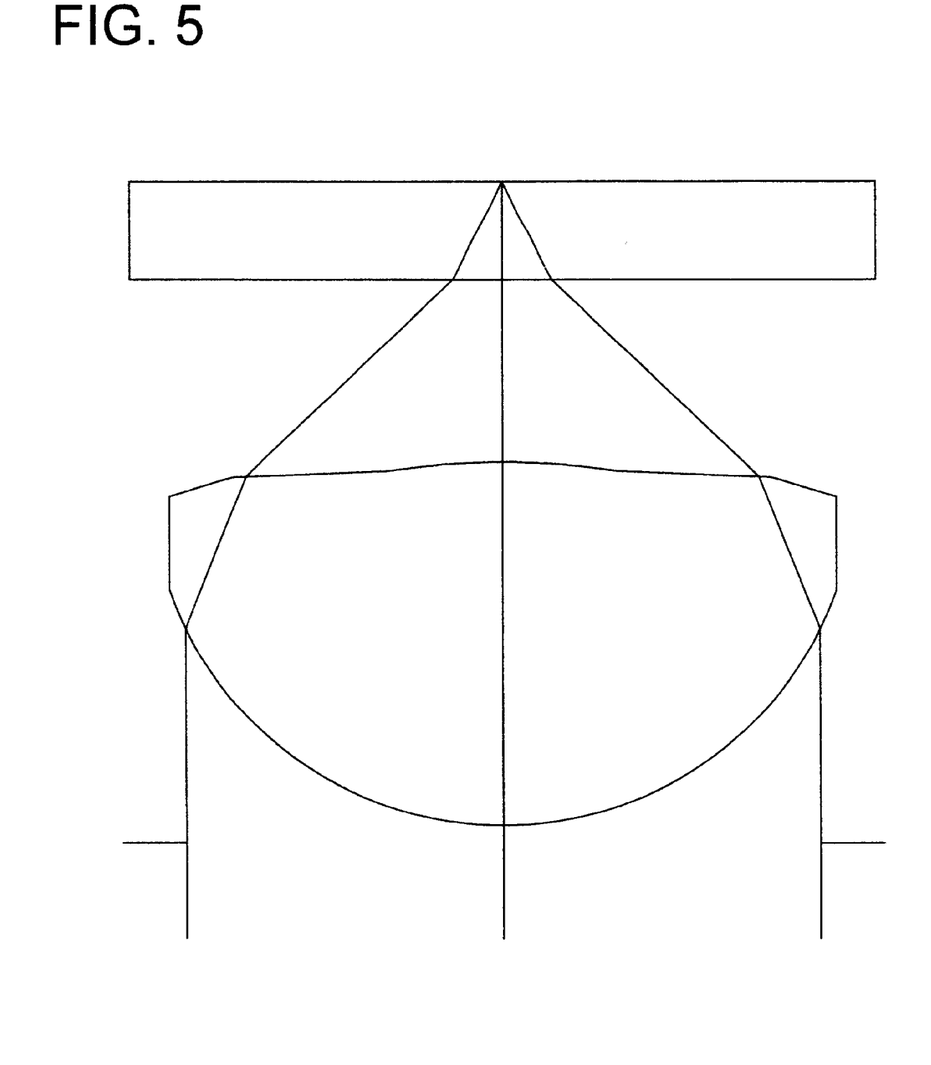
FIG. 5 is a sectional view of an objective lens of the present example.
Figure 6A:
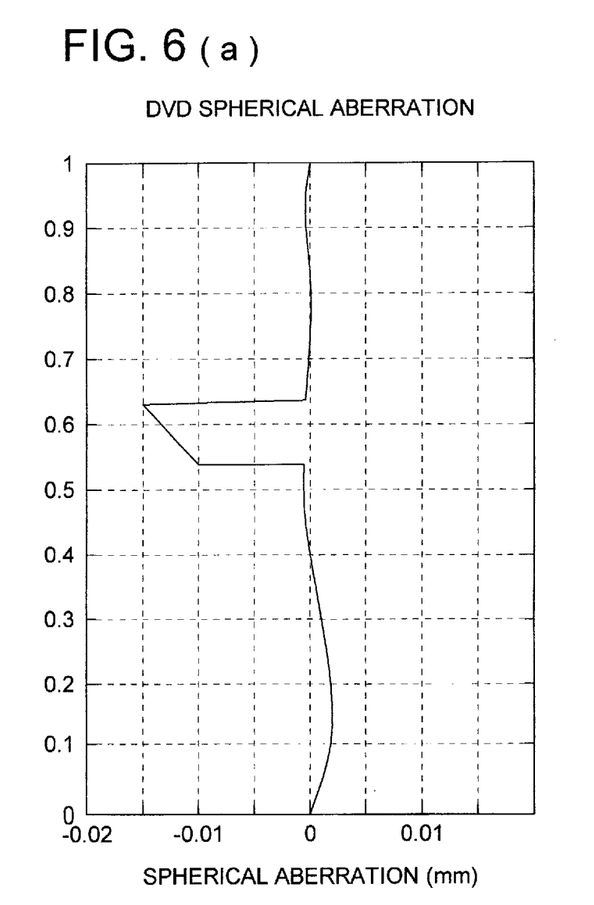
FIGS. 6(a) and 6(b) each is a diagram of spherical aberration for an objective lens of the present example.
Figure 6B:
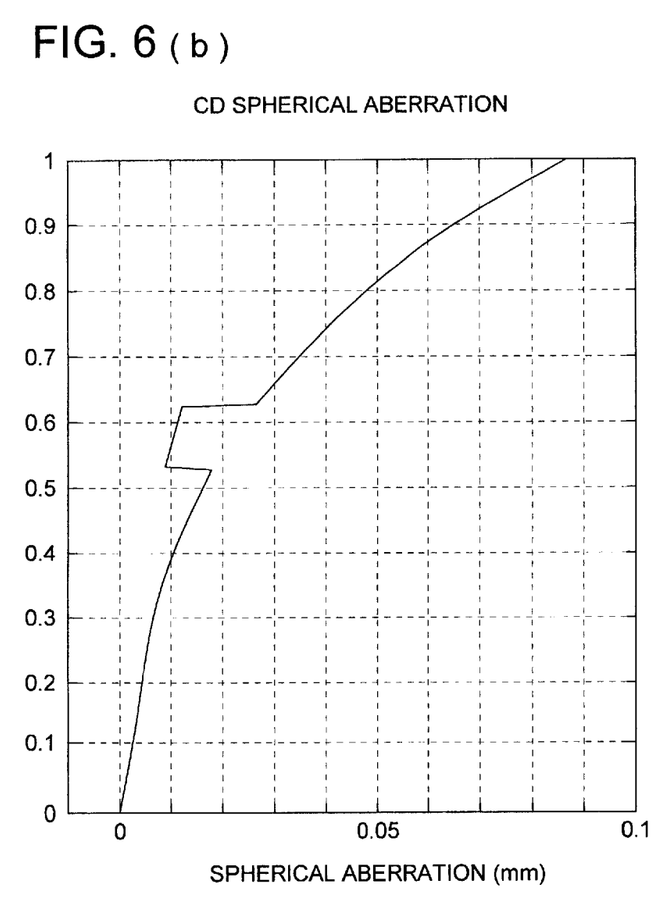

FIG. 5 is a sectional view of an objective lens in the present example, and FIG. 6 is a diagram of spherical aberration of the objective lens of the present invention. In the present example, it is possible to control the spherical aberration to be 0.003 λrms or less for the light flux that has passed the inner optical functional region and the outer optical functional region of the objective lens, even when higher numerical aperture NA1=0.72 and longer wavelength of light source wavelength λ=780 nm, as a condition of using DVD, as shown in FIG. 6(a). Incidentally, the numerical aperture NA2 for using CD is 0.455.

Figure 7:
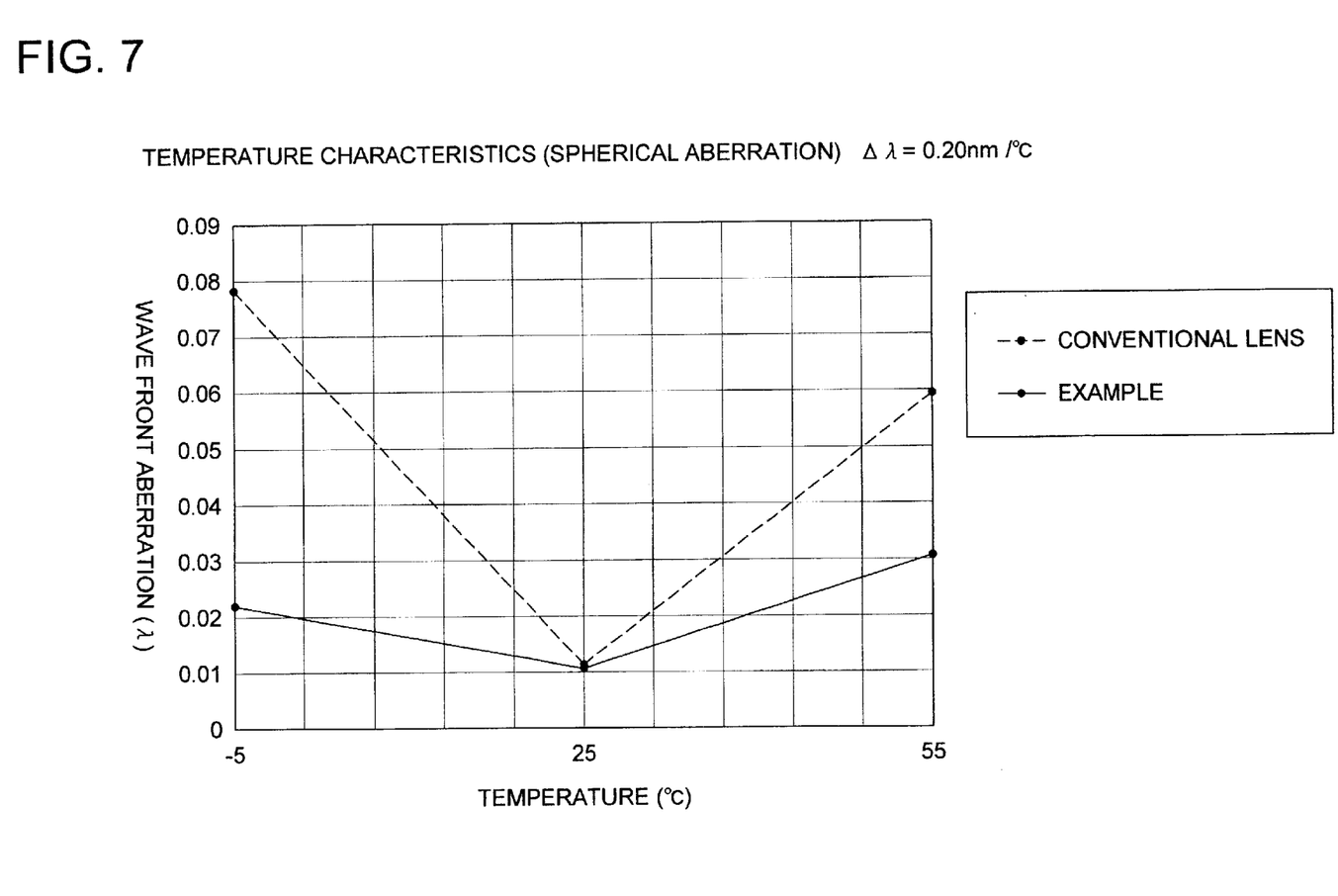
FIG. 7 is a diagram wherein a change rate of wavefront aberration for temperature changes (temperature characteristics) of the objective lens in the conventional technology and that of the objective lens in the present example are compared.

FIG. 7 is a diagram wherein a change rate of wavefront aberration for temperature changes (temperature characteristics) of the objective lens in the conventional technology and that of the objective lens in the present example are compared. As is apparent from FIG. 7, when a temperature is changed from a room temperature (20° C.) to 30° C., the maximum wavefront aberration value can be controlled to 0.031 λ or less in the present example, while, the maximum wavefront aberration value is increased to 0.077 λ in the conventional lens.

The invention makes it possible to provide an optical pickup device and an objective lens to be used for the optical pickup device wherein it is possible to conduct recording and/or reproduction of information for optical information recording media each being different from others, by using a single light source with a relatively long wavelength, without using additional electric circuits, and it is possible to control a decline of performance caused by changes of environmental conditions.

What is claimed is:

1. An objective lens for use in an optical pickup apparatus which comprises a light source and an optical converging system having the objective lens and conducts recording and/or reproducing information by focusing a light flux emitted from the light source on an information recording plane through a transparent base board of each of a first and second optical information recording mediums, the objective lens comprising:

an optical surface on which a plurality of optically functional regions are formed in a direction perpendicular to an optical axis at respective positions different in distance from the optical axis, wherein the plurality of optically functional regions include an inner optically functional region closer to the optical axis and an outer optically functional region located at an outside of the inner optically functional region, the inner optically functional region allows the light flux to pass through for conducting recording and/or reproducing information for the first and second optical information recording mediums, and the outer optically functional region allows the light flux to pass through for conducting recording and/or reproducing information for the first optical information recording medium; and a diffractive structure provided on the outer optically functional region;

wherein the following formulas are satisfied:

$$\lambda > 700 \text{ nm}$$

$$NA1 > 0.65$$

$$t1 < t2$$

wherein $\lambda$ is a wavelength of the light source, NA1 is an information recording medium side numerical aperture of the objective lens when recording or reproducing is conducted for the first information recording medium, t1 is a thickness of a transparent base board of the first information recording medium and t2 is a thickness of a transparent base board of the second information recording medium.

2. The objective lens of claim 1, wherein the plurality of optically functional regions comprise three optically functional regions or more and an intermediate optically functional region is provided between the inner optically functional region and the outer optically functional region.

3. The objective lens of claim 1, wherein the following formula is satisfied:

$$NA1 < 0.95$$

$$\lambda < 1000 \text{ nm.}$$

4. The objective lens of claim 1, wherein the following formula is satisfied:

$$0.3 < NA2 < 0.55$$

where NA2 is an information recording medium side numerical aperture of the objective lens when recording or reproducing is conducted for the second information recording medium.

5. The objective lens of claim 1, wherein the objective lens is made of a plastic material.

6. The objective lens of claim 1, wherein a stepped section is provided at each boundary section among the plurality of optically functional regions.

7. An optical pickup apparatus for conducting recording and/or reproducing information by focusing a light flux on an information recording plane through a transparent base board of each of a first and second optical information recording mediums, comprising:

a light source to emit a light flux; and an optical converging system having an objective lens; the objective lens having an optical surface on which a plurality of optically functional regions are formed in a direction perpendicular to an optical axis at respective positions different in distance from the optical axis, wherein the plurality of optically functional regions include an inner optically functional region closer to the optical axis and an outer optically functional region located at an outside of the inner optically functional region, the inner optically functional region allows the light flux to pass through for conducting recording and/or reproducing information for the first and second optical information recording mediums, and the outer optically functional region allows the light flux to pass through for conducting recording and/or reproducing information for the first optical information recording medium; and a diffractive structure provided on the outer optically functional region;

wherein the following formulas are satisfied:

$$\lambda > 700 \text{ nm}$$

$$NA1 > 0.65$$

$$t1 < t2$$

wherein $\lambda$ is a wavelength of the light source, NA1 is an information recording medium side numerical aperture of the objective lens when recording or reproducing is conducted for the first information recording medium, t1 is a thickness of a transparent base board of the first information recording medium and t2 is a thickness of a transparent base board of the second information recording medium.

8. The optical pickup apparatus of claim 7, wherein the plurality of optically functional regions comprise three optically functional regions or more and an intermediate optically functional region is provided between the inner optically functional region and the outer optically functional region.

9. The optical pickup apparatus of claim 7, wherein the following formula is satisfied:

$$NA1 < 0.95$$

$$\lambda < 1000 \text{ nm.}$$

10. The optical pickup apparatus of claim 7, wherein the following formula is satisfied:

$$0.3 < NA2 < 0.55$$

where NA2 is an information recording medium side numerical aperture of the objective lens when recording or reproducing is conducted for the second information recording medium.

11. The optical pickup apparatus of claim 7, wherein the objective lens is made of a plastic material.

12. The optical pickup apparatus of claim 7, wherein a stepped section is provided at each boundary section among the plurality of optically functional regions.

* * * * *